United States Patent [19]

Ando et al.

[11] Patent Number: 4,821,225
[45] Date of Patent: Apr. 11, 1989

[54] ARITHMETIC AND LOGIC UNIT WITH PRIOR STATE DEPENDENT LOGIC OPERATIONS

[75] Inventors: Hideki Ando; Hirohisa Machida, both of Hyogo, Japan

[73] Assignee: Mitsubishi Denki Kabushiki Kaisha, Tokyo, Japan

[21] Appl. No.: 42,532

[22] Filed: Apr. 27, 1987

[30] Foreign Application Priority Data

Apr. 30, 1986 [JP] Japan ................................. 61-102792

[51] Int. Cl.⁴ ................................................ G06F 7/38
[52] U.S. Cl. .................................................. 364/736.5
[58] Field of Search ............................. 364/768, 736.5

[56] References Cited

U.S. PATENT DOCUMENTS

| 3,278,733 | 10/1966 | Kowalski | 364/768 |
| 3,976,866 | 8/1976 | Motegi et al. | 364/768 |
| 4,323,981 | 4/1982 | Nakamura | 364/749 |
| 4,460,970 | 7/1984 | McClary | 364/761 |
| 4,589,087 | 5/1986 | Auslander et al. | 364/768 |
| 4,592,005 | 5/1986 | Kregness | 364/736 |
| 4,608,660 | 8/1986 | Hasebe | 364/768 |

OTHER PUBLICATIONS

Digital Logic and Computer Design, by M. Morris Mano, Prentice Hall, Inc., Englewood Cliffs, N.J. 07632, 1979.

Primary Examiner—David H. Malzahn
Attorney, Agent, or Firm—Lowe, Price, Leblanc, Becker & Shur

[57] ABSTRACT

The present invention is an arithmetic and logic unit of a microprocessor having hardware improved to execute specified operation such as operation of MAD (modified addition) by a small number of instruction steps.

The arithmetic and logic unit of the present invention has a control portion provided with a control circuit for performing the specified operation such as operation of MAD by a small number of instruction steps.

3 Claims, 7 Drawing Sheets

ARITHMETIC AND LOGIC UNIT WITH PRIOR STATE DEPENDENT LOGIC OPERATIONS

BACKGROUND OF THE INVENTION

1. Field of the Invention

The present invention relates to an arithmetic and logic unit in a microprocessor and particularly relates to an arithmetic and logic unit improved to simplify steps for executing prescribed operation.

2. Description of the Prior Art

In order to use a conventional microprocessor for a specified purpose, for example, for the purpose of frequently executing operation of MAD (modified addition) to be described in detail afterwards, it is necessary to improve the microprocessor so that it can perform efficiently and rapidly the MAD operation or the like with a small number of steps.

SUMMARY OF THE INVENTION

The present invention has been accomplished in view of such necessity and it is an object of the present invention to provide an arithmetic and logic unit in a microprocessor, in which hardware is improved to perform prescribed operation such as MAD operation with a small number of instruction steps.

An arithmetic and logic unit in accordance with the present invention comprises, in a control portion, a control circuit for performing prescribed operation such as MAD operation with a small number of instruction steps.

If the arithmetic and logic unit of the present invention is used, prescribed operation such as MAD operation, which would be performed with a relatively large number of instruction steps in a conventional microprocessor, can be performed with a very small number of instruction steps by means of a control circuit.

These objects and other objects, features, aspects and advantages of the present invention will become more apparent from the following detailed description of the present invention when taken in conjunction with the accompanying drawings.

DESCRIPTION OF THE RELATED ART AND PREFERRED EMBODIMENTS

Referring first to FIGS. 4 to 8, construction and operation of a typical microprocessor of the related art will be described.

Figure 4:
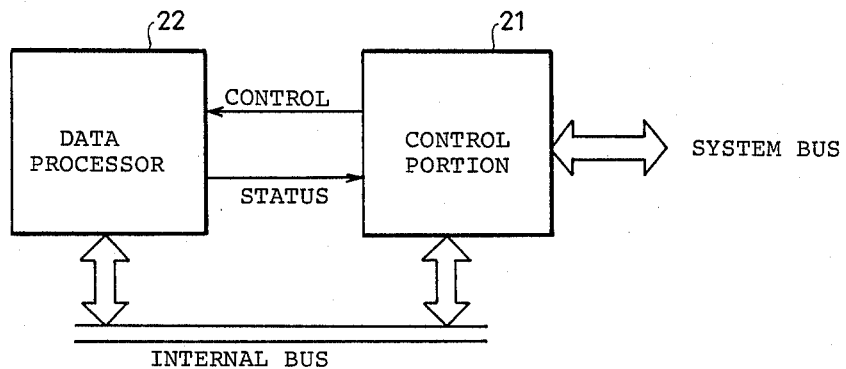
FIG. 4 is a schematic diagram showing a fundamental construction of a microprocessor of the related art.

FIG. 4 is a schematic diagram showing construction of the microprocessor. In FIG. 4, the reference numeral 21 denotes a control portion and the reference numeral 22 denotes a data processor. The control portion 21 controls the microprocessor. More specifically, the control portion 21 outputs an address to a memory outside the microprocessor through a system bus, and receives and decodes an instruction from the memory so that a control signal is provided to the data processor 22. The data processor 22 processes data based on the control signal and returns status information, if any, to the control portion 21. Transmission of data between the control portion 21 and the data processor 22 at the time of processing the data is effected through an internal bus.

Thus, the microprocessor operates by the above described control.

Figure 5:
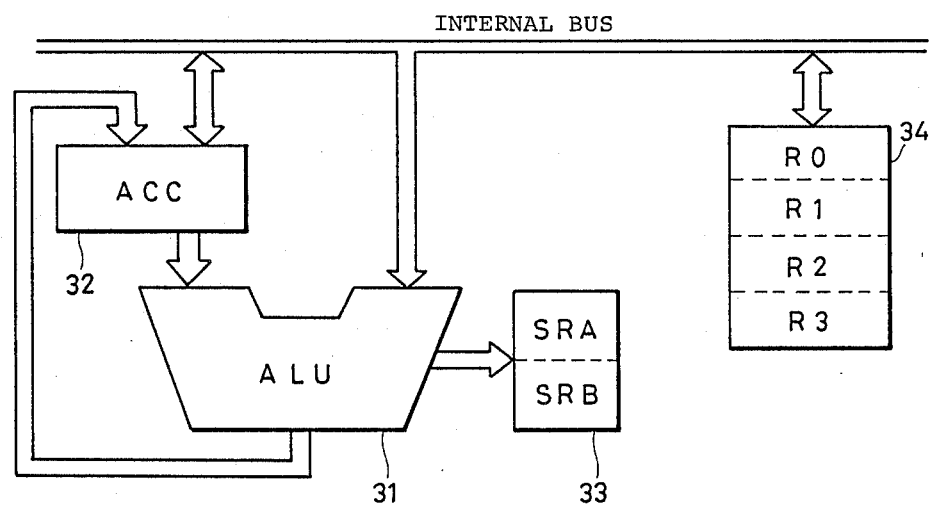
FIG. 5 is a block diagram showing a construction of a data processor 22 in FIG. 4.

FIG. 5 is a block diagram showing construction of the data processor 22 in FIG. 4. Referring to FIG. 5, the data processor 22 comprises components 31 to 34, namely an arithmetic and logic unit (ALU) 31, an accumulator 32, status registers means 33 comprising two registers SRA and SRB, and general purpose registers means 34 comprising four registers R0, R1, R2 and R3. Those components of the data processor 22 are connected suitably by the internal bus as shown in FIG. 5. The arithmetic and logic unit 31 performs operations such as addition and subtraction of the contents of the accumulator 32 or the general purpose register means 34 and provides the result to the accumulator 32. Based on the thus provided result of the operation of the arithmetic and logic unit 31, the status register means 33 sets a prescribed status state.

Figure 6:
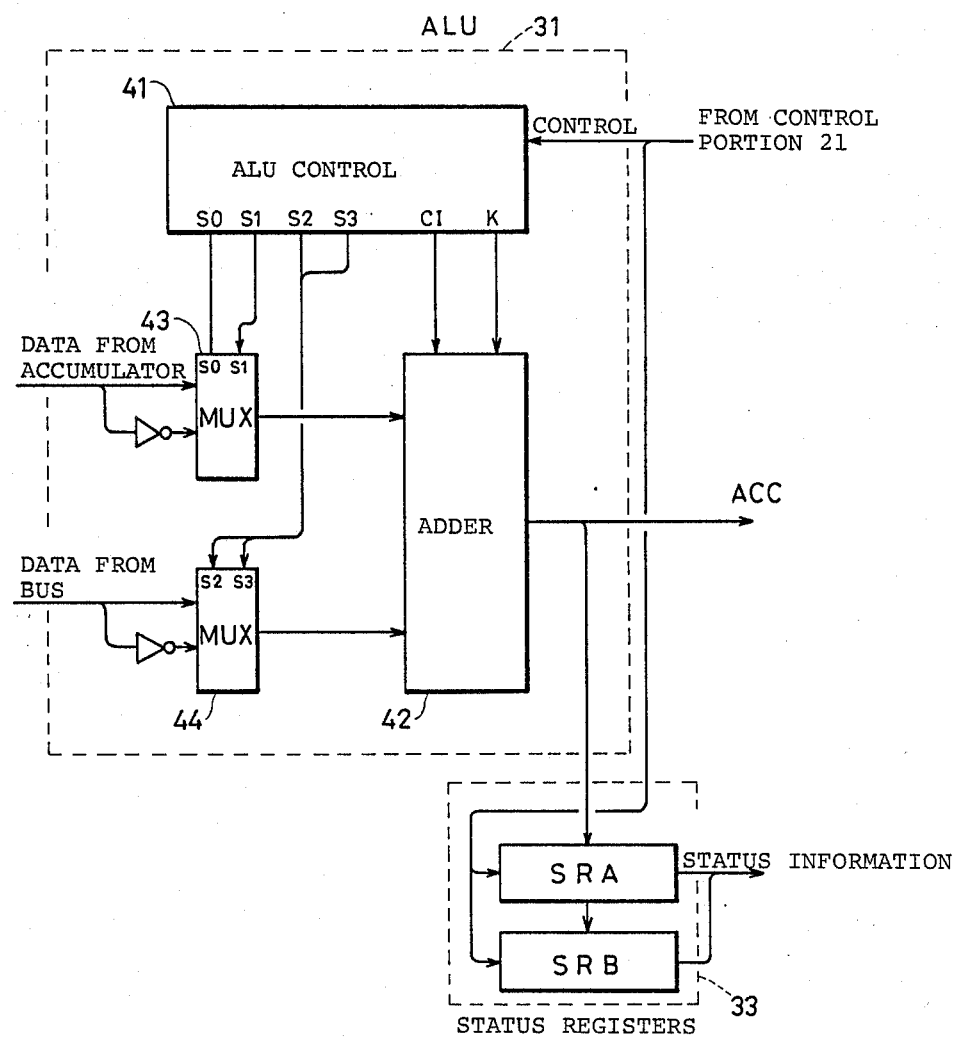
FIG. 6 is a block diagram showing, in more detail, a construction of an arithmetic and logic unit 31 and a status register 33 shown in FIG. 5.

FIG. 6 is a block diagram showing a more detailed construction of the arithmetic and logic unit 31 and the status registers means 33 in the data processor 22 shown in FIG. 5. Referring to FIG. 6, there are provided an ALU controller 41 for controlling the whole of the arithmetic and logic unit 31 composed of an adder 42, a multiplexer 43 for data provided from the accumulator 32, and a multiplexer 44 for data provided from the internal bus. A status register SRA in the status register means 33 is a register having a content (a state of a flag contained) changing at any time based on the result of the operation of the arithmetic and logic unit 31. The other status register SRB is a register for saving and holding the content of the status register SRA according to an instruction from the control portion 21.

Referring to FIG. 6, the processing operation of the arithmetic and logic unit 31 described above in connection with FIG. 6 will be more specifically described. The ALU controller 41 receives a control signal from the control portion 21 (as shown in FIG. 4) and controls the whole of the arithmetic and logic unit 31. Output signals S0, S1, S2 and S3 of the ALU controller 41 control the multiplexers 43 and 44. An output signal CI of the ALU controller 41 controls signal input to the adder 42. An output signal K of the ALU controller 41 controls forbidding of carry propagation in the adder 42. The multiplexer 43 multiplexes data from the accumulator 32 and negative data thereof based on the control signals S0 and S1 and outputs the result to the adder 42. On the other hand, the multiplexer 44 multiplexes data from the internal bus, namely, data provided from the general purpose register means 34 (as shown in FIG. 5) through the internal bus and negative data thereof based on the control signals S2 and S3 and provides an output to the adder 42. Table 1 indicated below is a truth table showing the output states of the multiplexers 43 and 44.

TABLE 1

| S1 | S0 | D0 |
|----|----|----|
| 0 | 0 | 0 |
| 0 | 1 | DI |
| 1 | 0 | $\overline{DI}$ |
| 1 | 1 | 1 |

Figure 7:
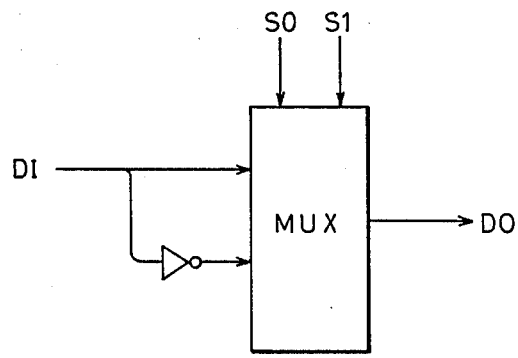
FIG. 7 shows a relation among an input, an output and a control signal of a multiplexer.

In the truth table 1, input data to the multiplexers 43 and 44 are represented as DI and $\overline{DI}$; output data thereto is represented as DO; and control signals thereto are represented as S0 and S1, as shown in FIG. 7.

Referring again to FIG. 6, the adder 42 adds the outputs of the multiplexers 43 and 44 and outputs the result to the accumulator 32 (as shown in FIG. 5). Part of the output of the adder 42 is supplied to the status register SRA. The status register SRA stores status flugs which indicate that the result of an operation of the adder 42 is whether positive, negative or zero. The other status register SRB receives and holds the content of the status register SRA according to the control instruction from the control portion 21 as described previously.

Now, an instruction set of the microprocessor will be described. The following Table 2 shows instruction sets of the microprocessor.

TABLE 2

| Operator | Operand | Function |
|----------|---------|----------|
| ADD | reg | ACC ← ACC+reg |
| SUB | reg | ACC ← ACC−reg |
| AND | reg | ACC ← ACC∩reg |
| OR | reg | ACC ← ACC∪reg |
| XOR | reg | ACC ← ACC⊕reg |
| MOV | reg1 reg2 | reg1 ← reg2 |
| JZ | label | if Z=1 then jump label |
| JS | label | if S=1 then jump label |
| JZB | label | if ZB=1 then jump label |
| JSB | label | if SB=1 then jump label |
| JMP | label | jump label |
| CALL | label | subroutine call |
| RET | | return |
| NOP | | no operation | reg, reg1, reg2: content of any of R0 to R3 and ACC
ACC: accumulator
Z: zero flag of SRA
S: sign flag of SRA
ZB: zero flag of SRB
SB: sign flag of SRB The contents of Table 2 will be briefly explained in the following. For example, the function of the operator ADD is to issue a command to perform addition, as shown, of a value of an arbitrary register reg determined by the program and a value of the accumulator 32, thereby to store the value obtained by the addition in the accumulator 32. The operator SUB commands subtraction; the operator AND commands operation of a logical product; the operator OR commands operation of a logical sum; and the operator XOR commands operation of an exclusive logical sum. The operator MOV issues a command to transfer a value of an arbitrary register reg2 to the reg1. The operator JZ issues a command to jump to an arbitrary label if Z=1 as shown. Similarly, the operator JS issues a command to jump to an arbitrary label if S=1; the operator JZB issues a command to jump to an arbitrary label if ZB=1; the operator JSB issues a command to jump to an arbitrary label if SB=1; and the operator JMP issues a command unconditionally to jump to an arbitrary label designated by the program. Further, the operator CALL issues a command to call a subroutine of an arbitrary label designated by the program; the operator RET issues a command to return to an initial branch point; and the operator NOP issues a command which indicates no operation.

As indicated above, Z represents a zero flag of the status register SRA; S represents a sign flag of the status register SRA; ZB represents a zero flag of the status register SRB; and SB represents a sign flag of the status register SRB.

Let us consider a case in which the below indicated operation is performed based on the instruction set shown in Table 2 by using the aforementioned microprocessor of the related art. More specifically, the following operation is performed.

$$ACC \leftarrow \begin{cases} R0 + R1: & ZB = 0, SB = 0 \text{ and } R3 = 1 \text{ or} \\ & ZB = 0, SB = 1 \text{ and } R3 = -1 \\ R0 - R1: & ZB = 0, SB = 1 \text{ and } R3 = 1 \text{ or} \\ & ZB = 0, SB = 0 \text{ and } R3 = -1 \\ R0: & ZB = 1 \text{ or } R3 = 0 \end{cases}$$

where
R3 is a register having a value of 1 or 0, or −1;
SB is a sign flag of the status register SRB; and
ZB is a zero flag of the status register SRB.

Figure 8:
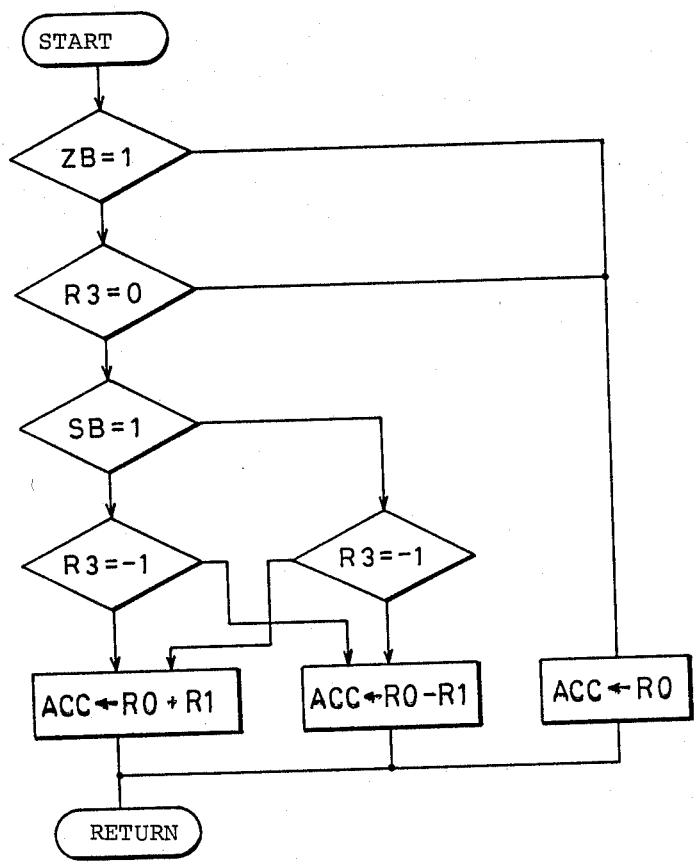
FIG. 8 is a flow chart showing steps for executing MAD operation by a microprocessor of the related art.

It is to be noted that this operation is an operation form frequently applied in algorithm of an automatic equalization in wire communication. This operation will be referred to hereinafter as MAD operation (MAD being modified addition as mentioned previously). A flow chart for performing MAD operation is shown in FIG. 8 and the program thereof is shown in Table 3.

TABLE 3

| | | |
|---|---|---|
| START: | JZB | NOPE |
| | MOV | ACC, R3 |
| | AND | R3 |
| | JZ | NOPE |
| | JSB | LAB1 |
| | JS | SUBT |
| | JMP | ADDT |
| ADDT: | MOV | ACC, R0 |
| | ADD | R1 |
| | RET | |
| LAB1: | JS | ADDT |
| SUBT: | MOV | ACC, R0 |
| | SUB | R1 |
| | RET | |
| NOPE: | MOV | ACC, R0 |
| | RET | |

As can be seen from Table 3, in the microprocessor of the related art, the program needs to have at least 16 steps to execute the MAD operation and, in addition, in the program of 16 steps, commands for branching, such as commands JZB, JZ, RET etc. occupy almost half of the steps, leaving only a small number of steps for executing the operation. Thus, the efficiency of this program is extremely reduced.

In the following, an embodiment of the present invention will be described referring to the drawings.

Figure 1:
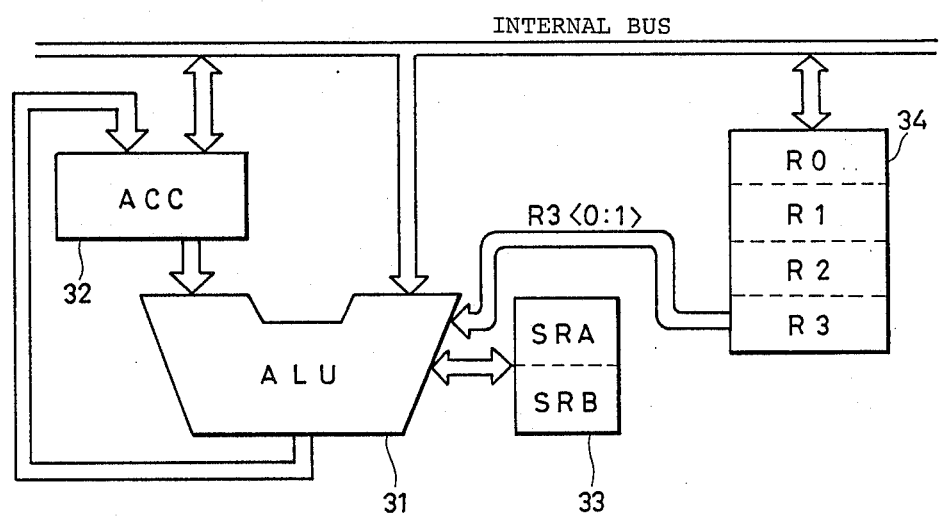
FIG. 1 is a diagram showing a construction of a data processor in an embodiment of the present invention.

FIG. 1 is a diagram showing construction of an arithmetic and logic unit of the embodiment provided in a data processor of a microprocessor. The data processor in FIG. 1 is controlled by a control portion in the same manner as in the aforementioned microprocessor of the related art. Referring to FIG. 1, the data processor comprises an arithmetic and logic unit (ALU) 31, an accumulator 32, status registers means 33 including two registers SRA and SRB, and general purpose registers means 34 including four registers R0, R1, R2 and R3. The construction of the data processor shown in FIG. 1 is almost the same as that of the data processor of the microprocessor of the related art, except that in this embodiment, an output signal of the status register SRB as an example of the first storage means and an output signal of the register R3 as an example of the second storage means are applied to the arithmetic and logic unit 31. This constitutes the first feature in the construction of this embodiment.

Figure 2:
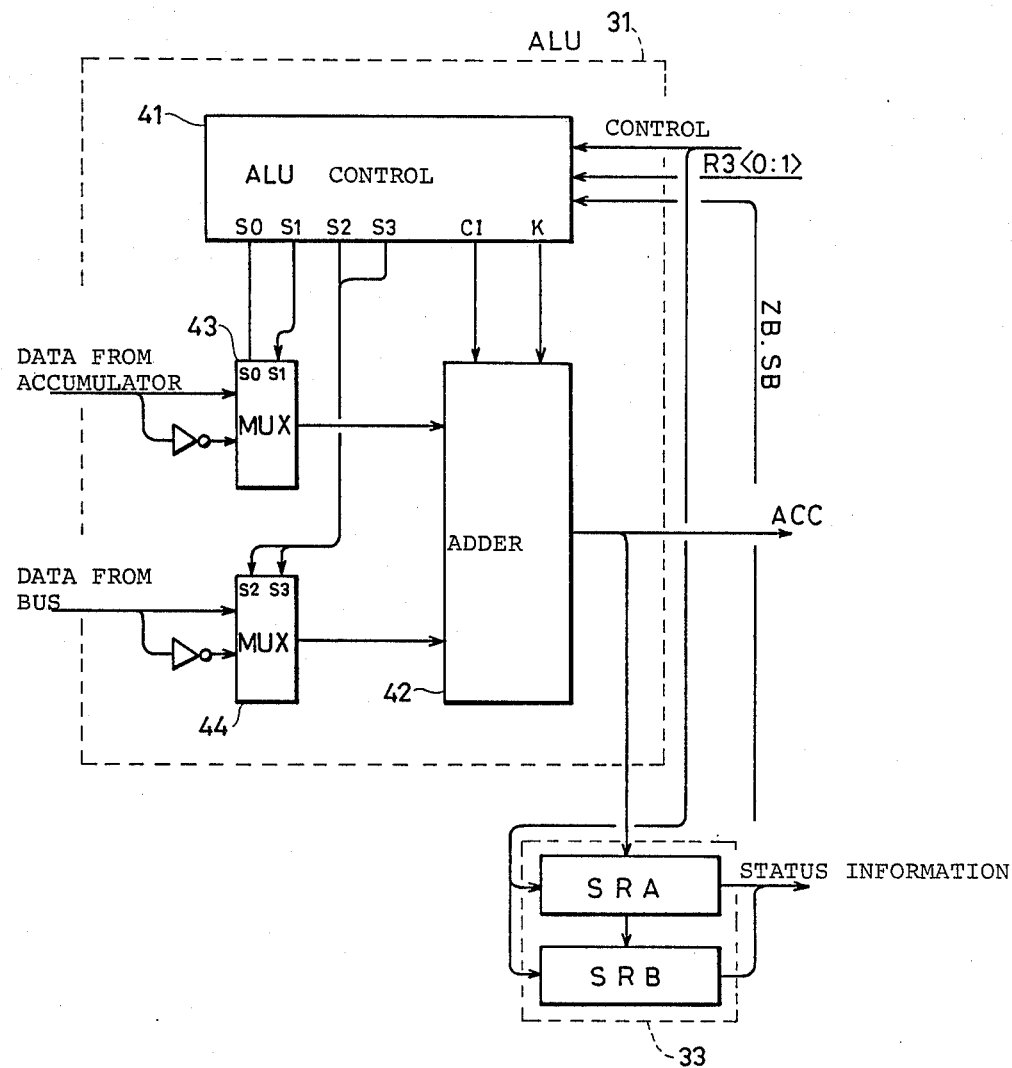
FIG. 2 is a block diagram showing details of connection among an arithmetic and logic unit 31, a status register 33 and a register R3 shown in FIG. 1.

FIG. 2 is a block diagram showing details of the connection among the arithmetic and logic unit 31, the status registers 33 and the register R3 shown in FIG. 1. As shown in FIG. 2, an output of the status register SRB is supplied to the ALU controller 41. Output signals from the register R3 are also supplied to the ALU controller 41.

Figure 3:
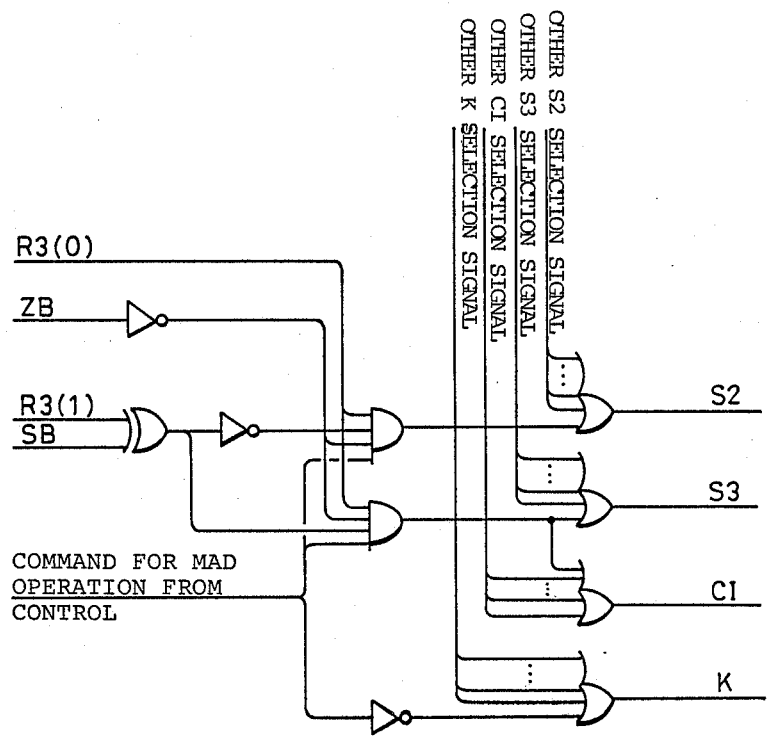
FIG. 3 shows a control circuit to be used in an embodiment of the present invention.

As is different from the controller 41 of the related art described in connection with FIG. 6, the ALU controller 41 shown in FIG. 2 further comprises a control circuit as shown in FIG. 3. This point constitutes the second feature in the construction of this embodiment.

The other construction in FIG. 2 is the same as in the related art.

The control circuit shown in FIG. 3 controls "addition (ADD)", "subtraction (SUB)" and "no operation (NOP)" in the MAD operation. This control circuit is a logic circuit which controls control signals to ALU depending on the status of the status register SRB and the contents of the register R3. A truth table of the control circuit in FIG. 3 is shown below as Table 4.

TABLE 4

| R3(1) | R3(0) | ZB | SB | S2 | S3 | C1 | Function of ALU |
|---|---|---|---|---|---|---|---|
| X | X | 1 | X | 0 | 0 | 0 | NOP |
| 0 | 0 | X | X | 0 | 0 | 0 | NOP |
| 0 | 1 | 0 | 0 | 1 | 0 | 0 | ADD |
| 1 | 1 | 0 | 0 | 0 | 1 | 1 | SUB |
| 0 | 1 | 0 | 1 | 0 | 1 | 1 | SUB |
| 1 | 1 | 0 | 1 | 1 | 0 | 0 | ADD | where X: don't care

Since the control circuit in FIG. 3 is provided in the ALU controller 41, the microprocessor including the arithmetic and logic unit of this embodiment is capable of performing the MAD operation according to a program of only three steps as shown in the below indicated Table 5.

TABLE 5

| MOV | ACC, R0 |
|---|---|
| MAD | R1 |
| RET | |

In Table 5, the operator MAD issues a command to perform operation of the arithmetic and logic unit 31 of the above described construction. The operation is as $$ACC \leftarrow \begin{cases} ACC + reg: & ZB = 0, SB = 0 \text{ and } R3 = 1 \text{ or} \\ & ZB = 0, SB = 1 \text{ and } R3 = -1 \\ ACC - reg: & ZB = 0, SB = 1 \text{ and } R3 = 1 \text{ or} \\ & ZB = 0, SB = 0 \text{ and } R3 = -1 \\ ACC: & ZB = 1 \text{ or } R3 = 0 \end{cases}$$

where ACC is the accumulator and reg is an arbitrary register designated in the program, which is the register R1 in this embodiment as is evident from Table 5.

In the embodiment of the invention, the control circuit provided in the ALU controller 41 needs only to be a logic circuit which satisfies the conditions in the truth table shown as Table 4 and it does not always need to be the logical circuit having the construction shown in FIG. 3.

Although the status register SRB as an example of the first storage means is composed of 2 bits comprising a zero flag and a sign flag in the above described embodiment, the status register SRB may be a register capable of storing information about "positive", "negative" or "zero". In addition, the register R3 as an example of the second storage means is not limited to the register of 2 bits as described above and it may be a register capable of storing information about "positive", "negative" or "zero".

In the truth table shown as Table 4, the state of the register R3 is expressed by 2 bits, namely, the more significant bit R3(1) and the less significant bit R3(0) and the state of the status register SRB is expressed by the 2 bits, namely, the zero flag ZB and the sign flag SB. Therefore, if the expression of information about "positive", "negative" or "zero" in the status register SRB and/or the register R3 is changed, the truth table is, needless to say, expressed in a different manner. In such a case, hardware of the arithmetic and logic unit needs to be changed so that a control circuit constructed based on the principle of the present invention may be included in the control portion of the arithmetic and logic unit.

Although in the above description, the MAD operation is taken as an example of specified operation, it is to be noted that if a microprocessor exclusively utilized for performing similar specified operations other than the MAD operation is manufactured, an arithmetic and logic unit provided in such a microprocessor based on the technical idea of the present invention is capable of attaining a desired object in the same manner as in the case of performing the MAD operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An arithmetic and logic unit capable of selectively executing one of predetermined logical operations responsive to an operating condition signal generated by an earlier logical operation of said arithmetic logic unit, thereby minimizing the need for branch on condition operations, said arithmetic and logic unit comprising:

first storage means for storing a portion of said operating condition signal generated during an earlier operation of said arithmetic and logic unit, said first storage means capable of storing three states representing "positive", "negative" and "zero" conditions, second storage means for storing a remaining portion of said operating condition signal, said second storage means capable of storing three states representing respectively said "positive", "negative" and "zero" conditions, a control circuit for selectively outputting "addition", "subtraction" and "no operation" control signals in response to said states stored in said first and second storage means, and an arithmetic and logic circuit for performing arithmetic operations responsive to said control signals output by said control circuit and for generating a new operating condition signal.

2. An arithmetic and logic unit in accordance with claim 1, further comprising storage registers R0 and R1, wherein said control circuit selectively outputs said control signals according to the following relationship:

$$\begin{cases} R0 + R1: & ZB = 0, SB = 0 \text{ and } R3 = 1 \text{ or} \\ & ZB = 0, SB = 1 \text{ and } R3 = -1 \\ R0 - R1: & ZB = 0, SB = 1 \text{ and } R3 = 1 \text{ or} \\ & ZB = 0, SB = 0 \text{ and } R3 = -1 \\ R0: & ZB = 1 \text{ or } R3 = 0 \end{cases}$$

where R0+R1, R0−R1 and R0 represent "addition", "substraction" and "no operation" control signals, respectively; SB and ZB represent storage states of the first storage means; and R3 represents storage states of the second storage means.

3. An arithmetic and logic unit in accordance with claim 1, wherein said control circuit outputs said control signal instructing:

"addition" when said first storage means has stored the "positive" state and said second storage means has stored the "positive" state, or when said first storage means has stored the "negative" state and said second storage means has stored the "negative" state, "substraction" when said first storage means has stored the "negative" state and said second storage means has stored the "positive" state, or when said first storage means has stored the "positive" state and said second storage means has stored the "negative" state, and "no operation" when said first storage means has stored said state of "zero", or when said second storage means has stored said state of "zero".

* * * * *